United States Patent [19]

Moss et al.

[11] 3,969,877
[45] July 20, 1976

[54] EDGER ATTACHMENTS

[76] Inventors: Robert J. Moss, 6319 S. Inwood Road, Shreveport, La. 71109; Forrest G. Hurst, 417 Town South Drive, Shreveport, La. 71105

[22] Filed: Oct. 10, 1974

[21] Appl. No.: 513,830

[52] U.S. Cl. ............................................... 56/256
[51] Int. Cl.² ...................................... A01D 53/14
[58] Field of Search .............. 56/256, 16.9; 172/15, 172/16, 122, 123

[56] References Cited
UNITED STATES PATENTS

| | | |
|---|---|---|
| 2,862,344 | 12/1958 | Caudle, Sr. et al. ............... 56/256 X |
| 3,018,599 | 1/1962 | Rambo ............................. 56/256 X |
| 3,192,693 | 7/1965 | Bergeson ......................... 56/256 X |
| 3,421,300 | 1/1969 | Rhodes ............................ 56/16.9 X |

*Primary Examiner*—Louis G. Mancene
*Assistant Examiner*—Daniel J. Leach

[57] ABSTRACT

An edger attachment for a lawn mower having a means for engaging and disengaging the attachment readily and completely from the mower and wherein the attachment is provided with a blade rotatable by the mower driving means in a normal vertical plane but which may be quickly and easily adjusted for trimming without turning the blade to the conventional horizontal position.

4 Claims, 9 Drawing Figures

EDGER ATTACHMENTS

The present invention pertains to edger attachments generally but more in particular to an attachment adapted to be mounted and operated by a lawn mower. The invention as shown herein is used in connection with a high-wheel type lawn mower wherein a power shaft of the mower is used to propel the mower wheels; the same shaft being used to drive the present attachment. However, the invention may be mounted upon most any conventional mower. For example, there are engines used on rotary type mowers which have an auxiliary drive shaft perpendicular to the main crankshaft. This auxiliary shaft can also be used as a source of power for the present invention.

One of the objects of the present invention is to provide an edger attachment for a lawn mower which may be easily mounted and detached from the mower proper. One of the main objections to former add-on types of edgers has been that they are usually permanently affixed to the mower so that when not in use, they must be pushed around with the mower as added bulk and weight.

Another object of the invention is the provision of an edger attachment for a lawn mower having a cutting blade arrangement which permits not only the normal vertical slicing such as desired along the edge of a walkway or the like, but also which provides for a trimming cut such as around a bush or tree. This feature also permits shallow ditching in soft earth.

Other objects of the invention include the provision of the normal operative mechanisms for engaging the device for operation, depth stops, etc.; all of which will be described in the course of the following detailed description in view of the accompanying drawing in which.

Figure 2:
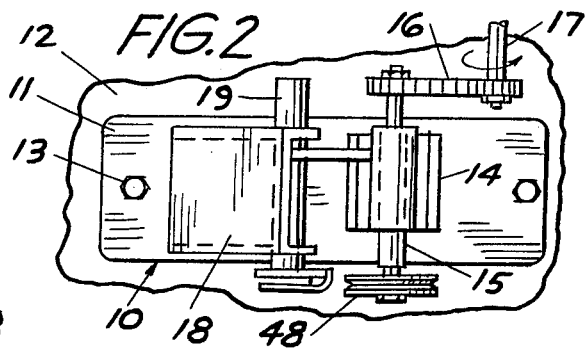
FIG. 2 is a top view of the arrangement shown in FIG. 1.

In the drawing numeral 10 designates the mounting assembly generally which is comprised of a base plate 11 mounted to the deck 12 of a lawn mower by means of bolts 13. On the base plate 11 is a bearing block 14 carrying a shaft 15 in the manner shown in FIG. 2. On the inner end of the shaft 15 is a sprocket having the same connected by a chain 16 to a power supply shaft 17 of a conventional mower machine. While shaft 15 may be rotated by other means, it is preferred that the attachment be used on a high-wheeled mower having one of its rotating shafts positioned above the mower deck and readily available for use as a driving means for the present edger attachment.

Numeral 18 designates a bracket member affixed to the base 11 and supporting a sleeve which serves as a tubular socket member 19. An arm 20 is mounted to the socket member 19 at one end thereof and adapted to rotate about the same. The arm extends upwardly in the manner shown and contains a slot 28 and a latch member 29, the purpose of which will be described later in the specification. These foregoing components and assemblies constitute, principally, the mounting assembly of the invention.

What might be termed the cutting element of the invention is more clearly illustrated by reference to FIGS. 3, 4 and 5 of the drawing which show a rectangular metal housing 21 enclosing a fixed core 22 and a slidable core 23; the slidable core being normally urged away from the rear core by means of a pair of compression springs 24 and 25. A stop member 61 prevents the slidable core 23 from coming out of the housing 21.

Extended through the housing and rear core 22 are two shafts, one of which 26 might be termed as a mounting shaft while the other 27 might be called a pivot shaft. The mounting shaft is adapted to be inserted into the hollow of the tubular socket member 19 while the other shaft 27 is nestled in slot 28 in the arm 20. When in such a position latch member 29 is moved into a slot 30 formed on the pivot shaft 27 and the attachment is thus securely mounted in operative position. The forward core 23 also supports a shaft 31 which is, in turn, journaled in a bearing 32 slidably mounted in a slot 33 in the forward end of the core member 23. The inner end of the shaft 31 carries a pulley 34 while the outer end carries the cutting blade assembly of the attachment designated generally by the numeral 35.

Figures 6, 7:
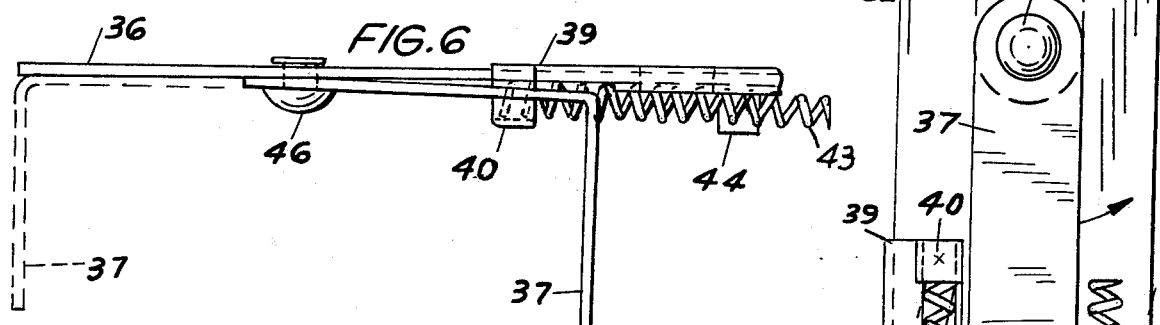
FIG. 6 is a broken sectional view taken along lines 6—6 of FIG. 4.
FIG. 7 is a face view of a portion of the cutter blade taken along lines 7—7 of FIG. 3.

The cutting blade assembly 35 is more clearly illustrated in FIGS. 6 and 7 wherein is shown the main cutting blade 36. The blade is, of course, provided with a hole midway its length in order to mount the same to the shaft 31. The blade is made of a good quality steel in the manner of those of the former art.

Figures 3, 4:
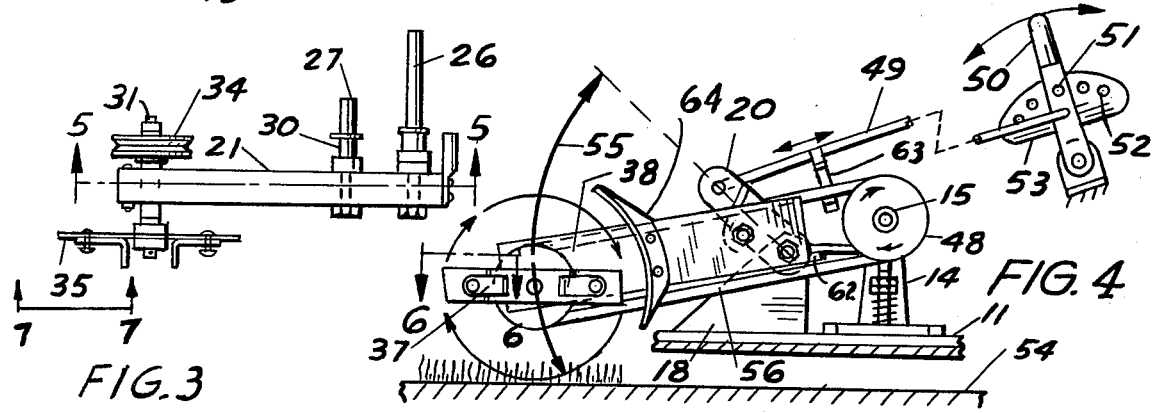
FIG. 3 is a top view of the edger attachment as removed from the receiving assembly shown in FIG. 1.
FIG. 4 is a side elevational view, partly broken, showing the complete assembly and action of the present invention.

The present blade assembly is different from any of the former art in that it is provided with a set of side cutting blades 37 and 38 as illustrated in FIG. 4. The arrangement of these blades is more clearly illustrated in FIGS. 6 and 7. Here the normal blade 36 is provided with a detachable metal jacket 39 completely spanning the width of the blade at its midpoint and crimped around each edge. The jacket 39 is also provided with loops 40 and 41 into which the ends of springs 42 and 43 are fastened so that the springs oppose one another in the manner illustrated in FIG. 7. Turned up beside each one of the spring loops but out of the path of travel of the side cutting blades are stop members 44 and 45. As shown by the drawings, the side cutting blades are fastened to the main cutting blade 36 by means of rivets 46. When the side cutting blades are not in use, they are folded in the manner shown with the bent cutting portion turned inwardly toward the central axis of rotation.

To release the side cutting blades, spring 43 is lifted over its stop member 44 to position it out of the path of travel of the side cutting blade 38 which may now be swung into the cutting position in the path shown by the arrow 47. The other side cutting blade 37 is put into cutting position in like manner.

Reference is now made to FIG. 4 which shows the device in a grass edging position. It will be noted here that the arm 20 is pivotally connected to a rod 49 with the upper end of the rod being connected to a lever 50 whch may be fastened to a portion of the lawn mower's handlebar (not shown). The lever contains a projecting pin 51 adapted for insertion into one of several holes 52 prepared in a flat plate 53 mounted also on the handlebar portion of the mower. Such construction is found in various combinations in the former art and is used to raise and lower the cutting blade 36 into and out of cutting position with respect to the ground level as indicated by the numeral 54 and according to the directional arrow 55. This action is also employed to tighten and loosen a V-belt 56 which connects pulleys 48 and 34. Since the V-belt's pivotal axis is around the center of the socket member 19, it is now obvious that when the attachment is raised out of cutting position, the V-belt is automatically loosened, thus stopping the rotation of the blade 36. Also, on the inner end of the housing 21 is a V-belt push-off bar 62 which lies in the path of travel of the driving belt 56. When the assembly is folded in the manner described above, this bar contacts the inside face of the belt 56 to take up the belt slack and prevent the belt from coming off the driving pulleys. Substantially opposite this push-off bar 62 is a V-belt pick-up finger 63 positioned beneath but adjacent to the inner face of the driving belt 56. When the mechanism is folded in the above-described manner to lift the cutting blade out of cutting position, this pick-up finger 63 contacts the belt and assists in preventing the belt from coming off the driving pulleys.

Figure 5:
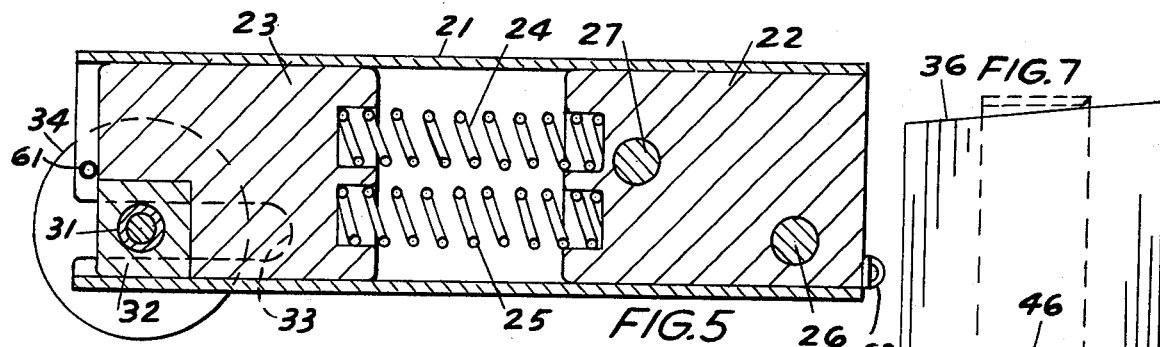
FIG. 5 is a cross-sectional view of the main pivot bar taken along line 5—5 of FIG. 3.

When the assembly of FIG. 3 is lowered into cutting position by means of the adjusting rod 49, the V-belt 56 is automatically tightened, thus giving driving power for the rotation of the blade 36 with the compression springs 24 and 25 keeping a yieldable pressure against the slidable core 23 of FIG. 5 and consequently a tension against the belt 56.

Figure 1:
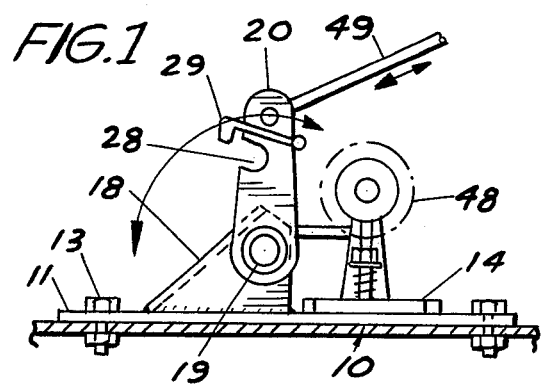
FIG. 1 is a broken, side elevational view of what might be termed the receiving assembly portion of the invention.
Figure 8:
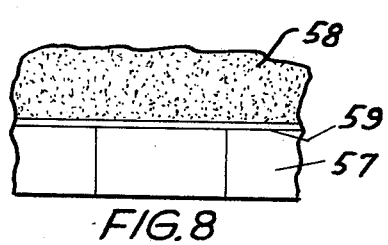
FIG. 8 is a plan view illustrating the result of using the edger in a vertical plane.

Let it be assumed now that it is desired to use the attachment on a mower upon which the mounting assembly of FIG. 1 has been affixed. The entire assembly of FIG. 3 is placed into a working position by inserting the shaft 26 into the receiving hole of the socket member 19. The shaft 27 is locked in place in the slot 28 by means of the latch member 29. The V-belt 56, of course, is placed over the two pulleys 48 and 34 and the device is ready for use. As described above, the entire mechanism may be raised or lowered by means of the handle 50. With the device arranged as in FIG. 4, the cutting action of the blade will appear as shown in the plan view of FIG. 8. In this view a walkway is designated by the numeral 57 with the adjoining lawn as numeral 58. Use of the blade in the conventional manner will produce a sharp line of cut 59 between the walkway and the grass.

Figure 9:
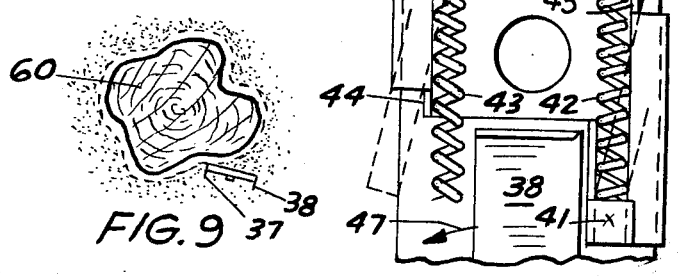
FIG. 9 is a plan view showing the method of using the alternate blades for trimming around a tree.

By employing the aforementioned side cutting blades 36 and 38, the present invention may be used to trim the grass in close quarters as shown in the plan view of FIG. 9. Here is shown a tree of irregular circumference, yet the side cutting blades are able to follow the contours and trim the grass with ease. When the trimming operation is completed the side cutting blades are simply folded into a non-operative position as formerly described.

It will be noted that these side cutting blades 37 and 38 are mounted to the main cutting blade 36 by means of a single rivet 46 around which they are free to rotate. The centrifugal force of the blade 36 in its rotation is sufficient to keep the side cutting blades thrown forwardly in a cutting position. Should the side cutting blades encounter a foreign object such as a rock or root, they simply yield around their own axis of rotation and will not suffer damage. Furthermore, the entire blade assembly is designed to yield upon striking an object due to the construction of the sliding bearing 23 and the compression springs 24 and 25 as formerly described. This is particularly advantageous when construction a shallow trench in a soft lawn. To protect the user from flying grass or dirt a suitable guard 64 is mounted to the metal housing 21. It consists of a length of sheet metal suitably curved just out of the path of travel of the cutting blade 36 and of such arcuate length as to prohibit any grass cuttings or other objects from being thrown backwardly toward the user of the device.

It will be understood that the cutting blade assembly 35 may be adapted for use on edgers of the former art and instead of the rivet holding the side cutters, other mounting means may be employed for their attachment and removal for sharpening or replacement. In fact, many other changes in actual construction may be made without departing from the spirit and scope of the invention as defined by the following claims.

We claim:

1. An edger attachment for a lawn mower comprising an edger receiving assembly adapted for attachment to the deck of a lawn mower and a blade cutting assembly adapted for attachment to said receiving assembly, said receiving assembly including a pulley arranged in drivable relationship with the driving means of said mower, a tubular socket member on said receiving assembly, an arm rotatably mounted on said socket member, a blade supporting housing on said cutting assembly having a mounting shaft adapted for insertion into said socket member and means for locking the same thereto against axial movement along said shaft, a control rod rotatably affixed to said arm and remotely connected to the handlebar of said mower for moving said arm through arcuate movements in a vertical plane, said blade supporting housing including a blade supporting shaft having a rotatable pulley adapted for connection with a pulley on said receiving assembly by a driving belt, said blade supporting housing also including a bearing for said supporting shaft, said bearing being slidably mounting in said housing and spring means for normally urging said bearing forwardly in said housing to place a yieldable pressure against said driving belt.

2. The device as claimed in claim 1 wherein said blade supporting shaft is provided with a cutting blade adapted to revolve in a vertical plane and means for setting a depth of cut by said blade with respect to the ground level on which said mower is being used.

3. The device as claimed in claim 2 wherein said cutting blade is provided with a pair of foldable side cutting blades, one of said pair being mounted near each end of said cutting blade, each side cutting blade including a leg portion extended laterally along and adjacent to said blade and pivotally mounted thereto while the opposite end of said blade is bent substantially 90° outwardly from the plane of said blade to constitute a cutter member for trimming grass in a horizontal plane.

4. The claim as in claim 3 including a nesting means for receiving said foldable side cutting blades when the same are folded around their pivotal axes toward the central axis of said blade, said nesting means provided with stop members to prevent said side cutting blades from being released by centrifugal force upon rotation of said blade.

* * * * *